United States Patent
Heid et al.

(10) Patent No.: US 9,509,200 B2
(45) Date of Patent: Nov. 29, 2016

(54) HF GENERATOR WITH IMPROVED SOLID-STATE SWITCH CONNECTIONS

(75) Inventors: Oliver Heid, Erlangen (DE); Timothy Hughes, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 350 days.

(21) Appl. No.: 14/008,090

(22) PCT Filed: Oct. 13, 2011

(86) PCT No.: PCT/EP2011/067900
§ 371 (c)(1),
(2), (4) Date: Sep. 27, 2013

(87) PCT Pub. No.: WO2012/130343
PCT Pub. Date: Oct. 4, 2012

(65) Prior Publication Data
US 2014/0015385 A1   Jan. 16, 2014

(30) Foreign Application Priority Data
Mar. 28, 2011   (DE) .......................... 10 2011 006 209

(51) Int. Cl.
*H02K 29/00* (2006.01)
*H01P 5/02* (2006.01)
(Continued)

(52) U.S. Cl.
CPC .............. *H02K 29/00* (2013.01); *H01P 5/026* (2013.01); *H01R 24/46* (2013.01); *H01R 2107/00* (2013.01)

(58) Field of Classification Search
CPC ...... H02K 29/00; H02K 47/00; H02K 47/02; H02K 47/04; H01P 5/02; H03B 5/18; H03B 9/14
USPC ................................ 310/68 R, 71, 72, 68 A
See application file for complete search history.

(56) References Cited

U.S. PATENT DOCUMENTS

| 2,641,658 | A | * | 6/1953 | Preist ................... | H03B 5/1835 |
|---|---|---|---|---|---|
| | | | | | 330/56 |
| 3,743,966 | A | * | 7/1973 | Grace .................... | H03B 9/145 |
| | | | | | 331/101 |

(Continued)

FOREIGN PATENT DOCUMENTS

| DE | 1 146 144 | 3/1963 |
|---|---|---|
| DE | 36 32 254 A1 | 4/1988 |

(Continued)

OTHER PUBLICATIONS

International Search Report for PCT/EP2011/067900; mailed Feb. 1, 2012.

(Continued)

*Primary Examiner* — Michael Andrews
(74) *Attorney, Agent, or Firm* — Slayden Grubert Beard PLLC

(57) ABSTRACT

An HF generator has first and second solid-state switches. Each of the solid-state switches has first and second output connectors and is designed to switch a high-frequency electrical current between the first and second output connectors. Furthermore, the HF generator has a coaxial cable with first and second conductors. The first conductor successively has a first section and a second section in the longitudinal direction of the coaxial cable which are separated from one another by a first break point. The first output connector of the first solid-state switch is conductively connected to the second conductor, and the second output connector of the first solid-state switch is conductively connected to the first section. In addition, the first output connector of the second solid-state switch is conductively connected to the first section, and the second output connector of the second solid-state switch is conductively connected to the second section.

18 Claims, 2 Drawing Sheets

(51) Int. Cl.
  *H01R 24/46* (2011.01)
  *H01R 107/00* (2006.01)

(56) References Cited

U.S. PATENT DOCUMENTS

| | | |
|---|---|---|
| 5,142,253 A | 8/1992 | Mallavarpu et al. |
| 5,185,586 A | 2/1993 | Zucker |
| 5,796,316 A | 8/1998 | Romerein |
| 2005/0242901 A1* | 11/2005 | Haunberger ............. H01P 5/02 333/33 |

FOREIGN PATENT DOCUMENTS

| | | |
|---|---|---|
| DE | 102011006209 | 3/2011 |
| EP | 0 455 485 A2 | 11/1991 |
| EP | 0 856 205 B1 | 6/1999 |
| GB | 2 032 715 A | 5/1980 |
| JP | 3-185912 | 8/1991 |
| JP | 3-192917 | 8/1991 |
| RU | 2 335 032 C1 | 9/2008 |
| SU | 265981 | 3/1970 |
| WO | 91/01565 | 2/1991 |

OTHER PUBLICATIONS

Office Action for German Patent Application No. 10 2011 006 209.2 dated Oct. 19, 2011.
O. Heid et al.; "Compact Solid State Direct Drive RF Linac"; Proceedings of IPAC '10, 2010; pp. 4278-4280.
Office Action dated Jan. 13, 2015 in corresponding Russian Patent Application No. 2012101777/08(002405).
Office Action dated Jun. 16, 2015 in corresponding Japanese Patent Application No. 2014-501455.

* cited by examiner

HF GENERATOR WITH IMPROVED SOLID-STATE SWITCH CONNECTIONS

CROSS REFERENCE TO RELATED APPLICATIONS

This application is the U.S. national stage of International Application No. PCT/EP2011/067900, filed Oct. 13, 2011 and claims the benefit thereof. The International Application claims the benefit of German Application No. 102011006209.2 filed on Mar. 28, 2011, both applications are incorporated by reference herein in their entirety.

BACKGROUND

Described below is an HF generator for generating HF power.

It is known to build up HF generators in a modular fashion from a plurality of HF modules. Known modular HF generators use HF modules which are connected to a power summer (combiner), for example by a coaxial cable. In doing so, it is usually necessary to match the output impedance of each HF module to the line impedance of the coaxial cable. A further impedance transformation is usually necessary within the power summer. Impedance transformations are usually achieved with frequency-selective components. For this reason, known HF generators have a narrow bandwidth.

SUMMARY

An aspect is to provide an HF generator with which a double impedance transformation is unnecessary.

An HF generator includes a first solid-state switch and a second solid-state switch, wherein each of the solid-state switches has a first output connector and a second output connector and is designed to switch a high-frequency electrical current between the first output connector and the second output connector. Furthermore, the HF generator includes a coaxial cable with a first conductor and a second conductor. At the same time, the first conductor successively has a first section and a second section in the longitudinal direction of the coaxial cable which are separated from one another by a first break point. At the same time, the first output connector of the first solid-state switch is conductively connected to the second conductor, and the second output connector of the first solid-state switch is conductively connected to the first section. In addition, the first output connector of the second solid-state switch is conductively connected to the first section, and the second output connector of the second solid-state switch is conductively connected to the second section.

Advantageously, in this HF generator, the solid-state switches are integrated in the power summer. In doing so, the optimum load impedance of the solid-state switches can be matched to the impedance of the coaxial cable by series connection of the solid-state switches. This avoids the need for impedance transformations.

The first solid-state switch may be arranged in a first chamber which is bounded by a first chamber wall running in the radial direction of the coaxial cable and a second chamber wall running in the radial direction of the coaxial cable. Advantageously, this decouples the first solid-state switch from the potential of the output voltage emitted by the coaxial cable.

Particularly, the second solid-state switch may be arranged in a second chamber which is bounded by a third chamber wall running in the radial direction of the coaxial cable and a fourth chamber wall running in the radial direction of the coaxial cable. Advantageously, the second solid-state switch is then also decoupled from the potential of the output voltage of the coaxial cable.

It is expedient that the second chamber wall and the third chamber wall are designed as one piece. Advantageously, the first chamber and the second chamber are then separated from one another by a common chamber wall. This allows a space-saving design of the HF generator.

The second chamber may be bounded in the radial direction of the coaxial cable by the first conductor and by a sleeve wall. Advantageously, the second solid-state switch is then completely enclosed by the walls of the second chamber.

In an improvement of the HF generator, the second chamber is filled with a dielectric or ferroelectric material. Advantageously, this can ensure that the amplitudes of the currents flowing in the chamber walls become negligibly small compared with the output current of the coaxial cable.

Particularly, the second solid-state switch may have a first supply connector, which is connected to a first supply cable, and a second supply connector, which is connected to a second supply cable. At the same time, sections of the first supply cable are arranged parallel to the third chamber wall and sections of the second supply cable parallel to the fourth chamber wall. Advantageously, the second solid-state switch can then be supplied with electrical power from the same direct voltage supply as the remaining solid-state switches of the HF generator.

In an embodiment of the HF generator, the first conductor is an outer conductor and the second conductor an inner conductor of the coaxial cable.

The solid-state switches may then be arranged outside the first conductor in the radial direction of the coaxial cable.

In another embodiment of the HF generator, the first conductor is an inner conductor and the second conductor an outer conductor of the coaxial cable.

The solid-state switches may then be arranged inside the first conductor in the radial direction of the coaxial cable.

In an improvement of the HF generator, a third solid-state switch is connected in parallel with the first solid-state switch or with the second solid-state switch. Advantageously, a higher output power of the HF generator can then be achieved. It is also advantageous that the load impedance of the third solid-state switch can then likewise be matched to the impedance of the coaxial output cable.

In an additional improvement of the HF generator, the first conductor has a third section which follows the second section in the longitudinal direction of the coaxial cable and is separated from the second section by a second break point, wherein a first output connector of a fourth solid-state switch is conductively connected to the second section, and a second output connector of the fourth solid-state switch is conductively connected to the third section. Advantageously, with the HF generator, further solid-state switches can be connected in series by continuing the cascade. This enables the output power of the HF generator to be increased.

It is expedient that the wave impedance of the coaxial cable changes abruptly at the first break point.

In an embodiment, the radius of the first conductor changes at the first break point. Advantageously, this enables an abrupt change in the wave impedance of the coaxial cable to be achieved.

In another embodiment of the HF generator, a dielectric of the coaxial cable changes at the first break point. Advantageously, this enables an abrupt change in the wave impedance of the coaxial cable to be achieved at the first break point.

The change in wave impedance at the first break point may correspond approximately to a load impedance of the second solid-state switch. Advantageously, the second solid-state switch can then be operated with its optimum load impedance.

It is expedient that the change in wave impedance at the first break point is approximately 10 ohms. Advantageously, the second solid-state switch can then be operated with a load impedance of 10 ohms. Alternatively, the second solid-state switch and a further solid-state switch connected in parallel with the second solid-state switch can be operated with an impedance of 20 ohms each.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
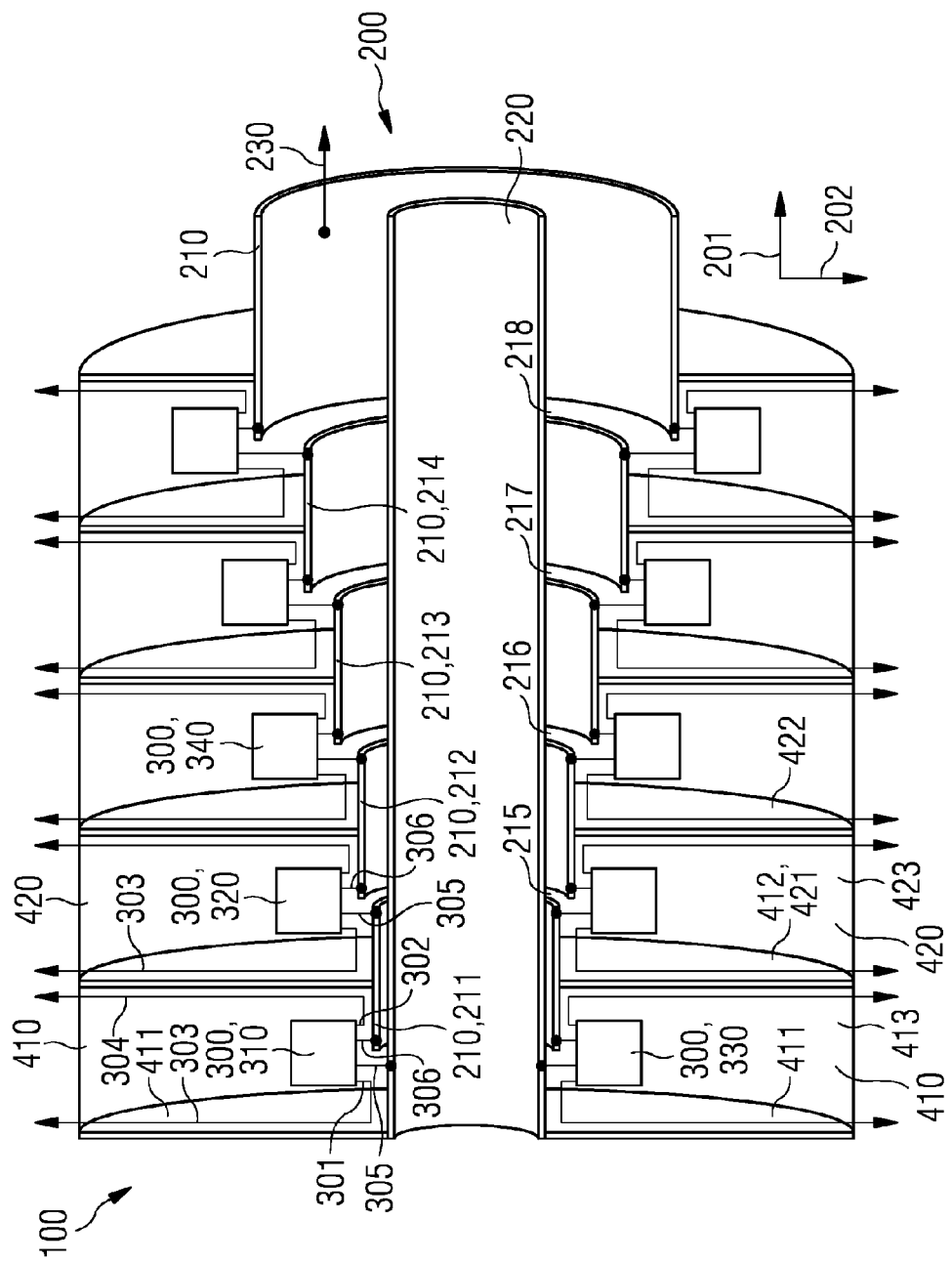
FIG. 1 is a schematic view of an HF generator according to a first embodiment.

Reference will now be made in detail to the preferred embodiments, examples of which are illustrated in the accompanying drawings, wherein like reference numerals refer to like elements throughout.

FIG. 1 shows a schematic sectional view of an HF generator 100 according to a first embodiment. The HF generator 100 is used to generate HF power, i.e. to generate a high-frequency electrical signal.

The HF generator 100 has a plurality of solid-state switches 300 for generating HF power. Each of the solid-state switches 300 is an HF module which is suitable for generating HF power. The term "solid-state switch" used in the following description and in the patent claims is understood to be not restricting in this sense.

Each of the solid-state switches 300 has a first supply connector 301 and a second supply connector 302. Each first supply connector 301 is connected to a first supply cable 303. Each second supply connector 302 is connected to a second supply cable 304. The solid-state switches 300 can be supplied with a direct voltage supply for operating the solid-state switches 300 via the supply cables 303, 304. In addition, each of the solid-state switches 300 has a first output connector 305 and a second output connector 306. Each of the solid-state switches 300 is designed to switch a high-frequency electrical current between its first output connector 305 and its second output connector 306.

The HF generator 100 also has a coaxial cable 200 which is used to summate the HF power generated by the solid-state switches 300 and to transmit the summated HF signal. The coaxial cable 200 has a first conductor 210, which forms an outer conductor of the coaxial cable, and a second conductor 220, which forms an inner conductor of the coaxial cable 200. The first conductor 210 is arranged around the outside of the second conductor 220 in a radial direction. The first conductor 210 and the second conductor 220 are each made of an electrically conducting material, such as a metal. The coaxial cable 200 has an output 230 at which the HF power generated and summated by the HF generator 100 is emitted.

The coaxial cable 200 defines a longitudinal direction 201, which corresponds to the extension direction of the coaxial cable 200, and a radial direction 202, which is oriented perpendicular to the longitudinal direction 201.

The first conductor 210 of the coaxial cable 200 is divided in the longitudinal direction 201 into a first section 211, a second section 212, a third section 213, and a fourth section 214. More or fewer than four sections 211, 212, 213, 214 can also be provided. The first section 201 is separated from the second section 212 by a first break point 215. The second section 212 is separated from the third section 213 by a second break point 216. The third section 213 is separated from the fourth section 214 by a third break point 217. The fourth section 214 is separated from a subsequent fifth section of the first conductor 210 by a fourth break point 218. The breakpoints 215, 216, 217, 218 can be in the form of circumferential annular slots, for example.

Each of the solid-state switches 300 is arranged outside the first conductor 210 in the radial direction 202 of the coaxial cable 200. The first output connector 305 of a first solid-state switch 310 is electrically conductively connected to the second conductor 220 of the coaxial cable 200. The second output connector 306 of the first solid-state switch 310 is electrically conductively connected to the first section 211 of the first conductor 210 of the coaxial cable 200. The first output connector 305 of a second solid-state switch 320 is electrically conductively connected to the first section 211 of the first conductor 210 of the coaxial cable 200. The second output connector 306 of the second solid-state switch 320 is electrically conductively connected to the second section 212 of the first conductor 210 of the coaxial cable 200. The second solid-state switch 320 is therefore arranged across the first break point 215. The first solid-state switch 310 and the second solid-state switch 320 are connected in series.

The first output connector 305 of a third solid-state switch 330 is electrically conductively connected to the second conductor 220 of the coaxial cable 200. The second output connector 306 of the third solid-state switch 330 is electrically conductively connected to the first section 211 of the first conductor 210 of the coaxial cable 200. The third solid-state switch 330 is therefore connected in parallel with the first solid-state switch 310. Further solid-state switches 300 which are likewise connected in parallel with the first solid-state switch 310 and the third solid-state switch 330 can be provided. The third solid-state switch 330 could, however, be omitted.

The first output connector 305 of a fourth solid-state switch 340 is electrically conductively connected to the second section 212 of the first conductor 210 of the coaxial cable 200. The second output connector 206 of the fourth solid-state switch 340 is electrically conductively connected to the third section 213 of the first conductor 210 of the coaxial cable 200. The fourth solid-state switch 340 is therefore arranged across the second break point 216. The fourth solid-state switch 340 is connected in series with the first solid-state switch 310 and the second solid-state switch 320. The fourth solid-state switch 340 could also be omitted. However, the HF generator 100 can also include further solid-state switches 300 which are arranged across the third break point 217, the fourth break point 218 and across further break points of the first conductor 210 of the coaxial cable 200 and are connected in series with the first solid-state switch 310 and the second solid-state switch 320. The HF generator 100 can also include further solid-state switches 300 which are connected in parallel with the second solid-state switch 320 and/or the fourth solid-state switch 340.

Accordingly, the HF generator 100 includes at least the first solid-state switch 310 and the second solid-state switch 320. Further solid-state switches 300 can be connected in parallel with these solid-state switches 310, 320. In addition, the HF generator 100 can have further cascade elements with further solid-state switches 300 which are connected in series with the first solid-state switch 310 and the second solid-state switch 320.

The wave impedance of the coaxial cable 200 changes abruptly at each of the break points 215, 216, 217, 218. In the embodiment shown by way of example in FIG. 1, this is achieved in that the radius of the first conductor 210 changes each time at the break points 215, 216, 217, 218. However, it is not absolutely necessary that the change in radius occurs exactly at the break points. The positions of the change in radius of the first conductor 210 and the positions of the break points 215, 216, 217, 218 of the first conductor 210 can also be offset with respect to one another in the longitudinal direction 201 of the coaxial cable 200. Alternatively, the radius of the first conductor 210 can also be constant in the longitudinal direction 201 of the coaxial cable 200. In this case, the change in wave impedance between the sections 211, 212, 213, 214 of the first conductor 210 can be achieved by changes in a dielectric of the coaxial cable 200.

The change in wave impedance of the coaxial cable 200 at each of the break points 215, 216, 217, 218 may correspond to the load impedance of a solid-state switch 300 arranged across the respective break point 215, 216, 217, 218, or, in the case of a plurality of solid-state switches 300 connected in parallel across a break point 215, 216, 217, 218, the load impedance of the parallel connection of solid-state switches 300. This avoids the need for an impedance transformation between the solid-state switch 300 and the coaxial cable 200. If, for example, each of the solid-state switches 300 has an output voltage of 200 V and an output current of 10 A and if two solid-state switches 300 are connected in parallel at each of the break points 215, 216, 217, 218, then the change in wave impedance of the coaxial cable 200 at each of the break points 215, 216, 217, 218 should be approximately 10 ohms.

The first solid-state switch 310 and the third solid-state switch 330 are arranged in a first chamber 410. The first chamber 410 is bounded in the longitudinal direction 201 of the coaxial cable 200 by a first chamber wall 411 running in the radial direction 202 of the coaxial cable 200, and a second chamber wall 412 running parallel to the first chamber wall 411. The first chamber wall 411 is made of an electrically conducting material, such as a metal, and is electrically conductively connected to the second conductor 220. The second chamber wall 412 is likewise made of a conducting material and is conductively connected to the first section 211 of the first conductor 210. The first chamber 410 is bounded on the outside in the radial direction 202 by a sleeve wall 413 of the first chamber 410. The sleeve wall 413 is in the form of a cylindrical sleeve and is made of an electrically conducting material. The sleeve wall 413 is electrically conductively connected to the first chamber wall 411 and to the second chamber wall 412. The first chamber 410 is bounded on the inside in the radial direction 202 by a part of the first section 211 of the first conductor 210 and by a part of the conductor 220 of the coaxial cable 200.

The first supply cable 303 of the first solid-state switch 310 runs radially outwards parallel to the first chamber wall 411 of the first chamber 410. The second supply cable 304 of the first solid-state switch 310 runs radially outwards parallel to the second chamber wall 412 of the first chamber 410. The supply cables 303, 304 of the third solid-state switch 330, which is likewise arranged in the first chamber 410, run in a corresponding manner. The supply cables 303, 304 may be located as close as possible to or in direct contact with the chamber walls 411, 412. This ensures that the solid-state switches 310, 330 are decoupled from the potential of the output voltage.

The second solid-state switch 320 is arranged in a second chamber 420 which is bounded in the longitudinal direction 201 by a first chamber wall 421 and a second chamber wall 422 of the second chamber 420. The first chamber wall 421 and the second chamber wall 422 of the second chamber 420 in turn run in the radial direction 202 of the coaxial cable 200. The first chamber wall 421 of the second chamber 420 may simultaneously form the second chamber wall 412 of the first chamber 410. The second chamber 420 in turn is bounded outwards in the radial direction 202 by a sleeve wall 423 of the second chamber 420, while it is bounded inwards in the radial direction 202 by a part of the first section 211 of the first conductor 210 and a part of the second section 212 of the first conductor 210. The first supply cable 303 of the second solid-state switch 320 runs parallel to the first chamber wall 421 of the second chamber 420. The second supply cable 304 of the second solid-state switch 320 runs parallel to the second chamber wall 422 of the second chamber 420. The supply cables 303, 304 of the second solid-state switch 320 may be located in direct contact with the chamber walls 421, 422 of the second chamber 420.

The fourth solid-state switch 340, which is arranged at the second break point 216 of the first conductor 210, is correspondingly located in a third chamber. All further solid-state switches 300 which are connected in series are likewise each located in corresponding chambers. Arranging the solid-state switches 300 in chambers 410, 420 ensures that the solid-state switches 300 are decoupled from the potential of the output voltage of the coaxial cable 200. This enables all solid-state switches 300 to be supplied by common direct voltage supplies via their respective supply cables 303, 304. The chambers 410, 420 can be filled with dielectric or ferromagnetic filling materials.

Figure 2:
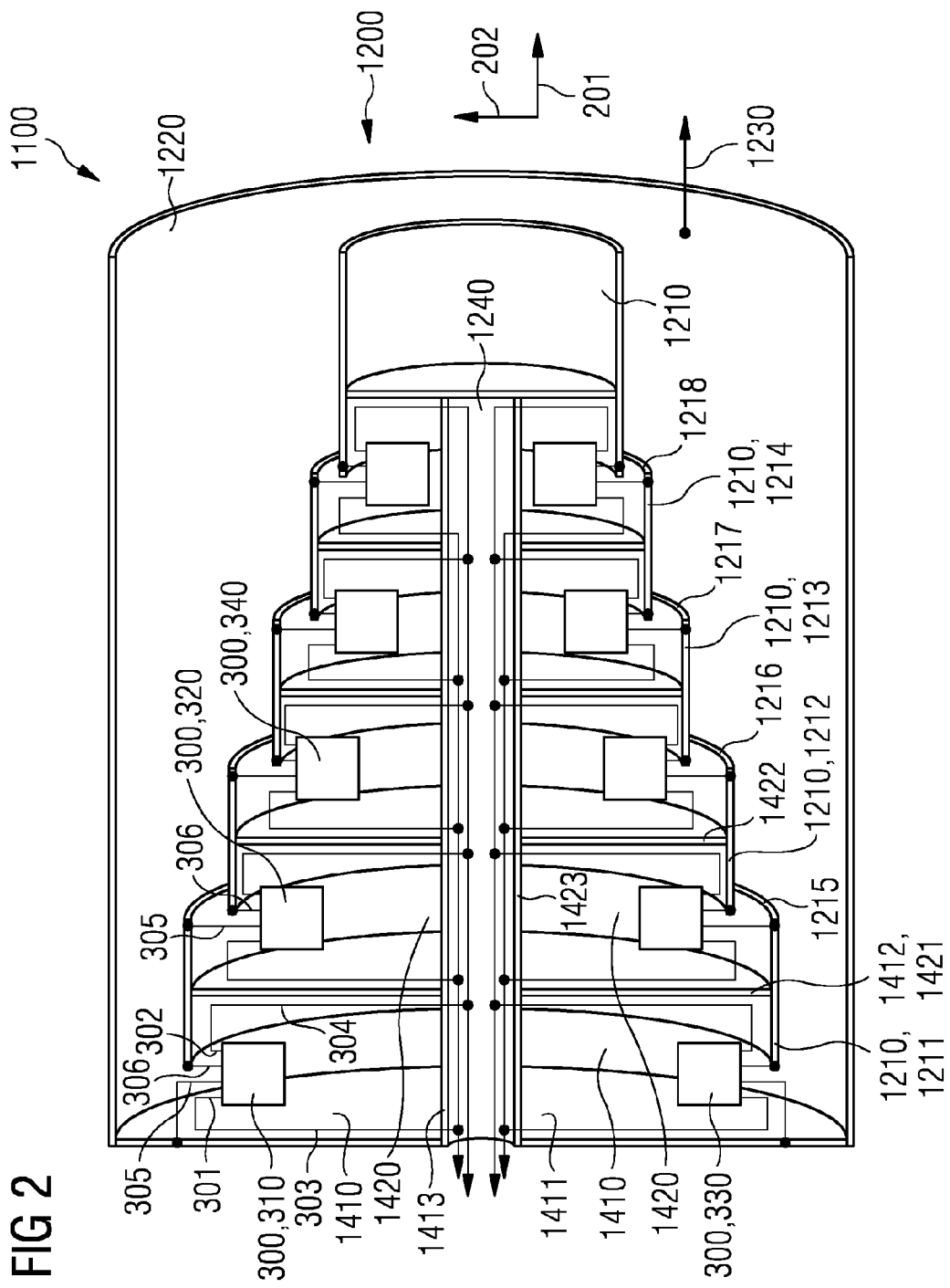
FIG. 2 is a schematic view of an HF generator according to a second embodiment.

FIG. 2 shows an HF generator 1100 according to a second embodiment in a schematic sectional view. Like the HF generator 100 of the first embodiment, the HF generator 1100 of the second embodiment is used to generate HF power.

The HF generator 1100 in turn has a plurality of solid-state switches 300 which correspond to the solid-state switches 300 of the HF generator 100 of FIG. 1. The HF generator 1100 also has a coaxial cable 1200 which is used to summate the HF power generated by the solid-state switches 300 and to transmit the summated HF power to an output 1230.

The coaxial cable 1200 has a first conductor 1210, which forms an inner conductor of the coaxial cable 1200. The coaxial cable 1200 also has a second conductor 1220, which forms an outer conductor of the coaxial cable 1200. The coaxial cable 1200 in turn defines a longitudinal direction 201 and a radial direction 202. The longitudinal direction 201 corresponds to the longitudinal extension direction of the coaxial cable 1200. The second conductor 1220 is arranged around the outside of the first conductor 1210 in a radial direction.

The first conductor 1210 includes a first section 1211, a second section 1212, a third section 1213 and a fourth section 1214. The first section 1211 of the first conductor 1210 is separated from the second section 1212 by a first break point 1215. The second section 1212 of the first conductor 1210 is separated from the third section 1213 by a second break point 1216. The third section 1213 of the first conductor 1210 is separated from the fourth section 1214 by a third break point 1217. The break points 1215, 1216, 1217 can each be in the form of circumferential annular slots. More or fewer than four sections 1211, 1212, 1213, 1214, which are separated from one another by break points 1215, 1216, 1217 respectively, can also be provided.

The solid-state switches 300 of the HF generator 1100 are arranged inside the first conductor 1210 in a radial direction 202. The first conductor 1210 is therefore in the form of a hollow body.

The first output connector 305 of a first solid-state switch 310 of the HF generator 1100 is electrically conductively connected to the second conductor 1220. The second output connector 306 of the first solid-state switch 310 is electrically conductively connected to the first section 1211 of the first conductor 1210 of the coaxial cable 1200. The first output connector 305 of a second solid-state switch 320 of the coaxial cable 1200 is electrically conductively connected to the first section 1211 of the first conductor 1210. The second output connector 306 of the second solid-state switch 320 is electrically conductively connected to the second section 1212 of the first conductor 1210. The second solid-state switch 320 is therefore arranged across the first break point 1215. The first solid-state switch 310 and the second solid-state switch 320 are connected in series.

The first output connector 305 of a third solid-state switch 330 of the HF generator 1100 is electrically conductively connected to the second conductor 1220 of the coaxial cable 1200. The second output connector 306 of the third solid-state switch 330 is electrically conductively connected to the first section 1211 of the first conductor 1210 of the coaxial cable 1200. The third solid-state switch 330 is therefore connected in parallel with the first solid-state switch 310.

The first output connector 305 of a fourth solid-state switch 340 is electrically conductively connected to the second section 1212 of the first conductor 1210. The second output connector 306 of the fourth solid-state switch 340 is electrically conductively connected to the third section 1213 of the first conductor 1210. The fourth solid-state switch 340 is therefore connected in series with the first solid-state switch 310 and the second solid-state switch 320. The fourth solid-state switch 340 is arranged across the second break point 1216 of the first conductor 1210 of the coaxial cable 1200.

The HF generator 1100 can include further solid-state switches 300 which are arranged across the further break points 1217 and are connected in series with the first solid-state switch 310, the second solid-state switch 320 and the fourth solid-state switch 340. The HF generator 1100 can also include further solid-state switches 300 which are connected in parallel with the first solid-state switch 310, the second solid-state switch 320 and the fourth solid-state switch 340. The fourth solid-state switch 340 can also be omitted however.

The wave impedance of the coaxial cable 1200 changes abruptly at each of the break points 1215, 1216, 1217. As shown schematically in FIG. 2, this can be achieved in that the radius of the first conductor 1210 changes abruptly at each of the break points 1215, 1216, 1217. Alternatively, instead of a change in the radius of the first conductor 1210 of the coaxial cable 1200, a dielectric of the coaxial cable 1200 can change at each of the break points 1215, 1216, 1217. As already explained with reference to FIG. 1, the positions of the changes in the wave impedance of the coaxial cable 1200 in the longitudinal direction do not have to coincide with the break points 1215, 1216, 1217 but can also be displaced relative thereto in the longitudinal direction 201. All that is necessary is that the wave impedance of the coaxial cable 1200 changes between two sections 1211, 1212, 1213, 1214 of the first conductor 1210. The sizes of the changes in the wave impedance of the coaxial cable 1200 may be such that they correspond to the output impedance of the solid-state switches 300 connected in parallel across a break point 1215, 1216, 1217.

The first conductor 1210 of the coaxial cable 1200 has an axial hollow space 1240 which extends along the longitudinal axis of the first conductor 1210 and is bounded by a sleeve surface. The solid-state switches 300 are arranged between the sleeve surface of the axial hollow space 1240 and the outer sleeve surface of the first conductor 1210.

The first solid-state switch 310 and the third solid-state switch 330 are arranged in a first chamber 1410. The first chamber 1410 is bounded in the longitudinal direction 201 of the coaxial cable 1200 by a first chamber wall 1411 and a second chamber wall 1412 of the first chamber 1410. The first chamber wall 1411 and the second chamber wall 1412 run perpendicular to the longitudinal direction 201 of the coaxial cable 1200. The first chamber wall 1411 is electrically conductively connected to the sleeve wall of the axial hollow space 1240 of the first conductor 1210, and electrically conductively connected to the second conductor 1220 of the coaxial cable 1200 and therefore short-circuits the first conductor 1210 and the second conductor 1220. The second chamber wall 1412 of the first chamber 1410 is electrically conductively connected to the sleeve surface of the axial hollow space 1240, and electrically conductively connected to the first section 1211 of the first conductor 1210. The first chamber 1410 is also bounded inwards in the radial direction 202 by a section 1413 of the sleeve wall of the axial hollow space 1240 and outwards by a part of the first section 1211 of the first conductor 1210. In the first chamber 1410, the first supply cable 303 of the first solid-state switch 310 runs towards the axial hollow space 1240 parallel to the first chamber wall 1411, and runs further through the section 1413 of the sleeve wall of the axial hollow space 1240 into the axial hollow space 1240. The second supply cable 304 of the first solid-state switch 310 runs parallel to the second chamber wall 1412 of the first chamber 1410, through the section 1413 of the sleeve wall of the axial hollow space 1240 and into the axial hollow space 1240. The supply cables 303, 304 of the first solid-state switch 310 are arranged as close as possible to the chamber walls 1411, 1412 of the first chamber 1410. The third solid-state switch 330 is likewise arranged in the first chamber 1410 in a similar manner.

The second solid-state switch 320 is arranged in a second chamber 1420 which extends between the sleeve surface of the axial hollow space 1240 and the outer sleeve surface of the first conductor 1210. The second chamber 1420 is bounded in the longitudinal direction 201 of the coaxial cable 1200 by a first chamber wall 1421 and a second chamber wall 1422 which run perpendicular to the longitudinal direction 201. The first chamber wall 1421 of the second chamber 1420 is practically identical with the second chamber wall 1412 of the first chamber 1410. The first chamber wall 1421 of the second chamber 1420 is electrically conductively connected to the sleeve surface of the axial hollow space 1240 of the first conductor 1210, and electrically conductively connected to the first section 1211 of the first conductor 1210. The second chamber wall 1422 of the second chamber 1420 is electrically conductively connected to the sleeve surface of the axial hollow space 1240 of the first conductor 1210, and electrically conductively connected to the second section 1212 of the first conductor 1210. In the radial direction 202, the second chamber 1420 is bounded outwards by a part of the first section 1211 of the first conductor 1210 and a part of the second section 1212 of the first conductor 1210. In the radial direction 202 inwards, the second chamber 1420 is bounded by a section 1423 of the sleeve wall of the axial hollow space 1240. The supply cables 303, 304 of the second solid-state switch 320 again run parallel to the chamber walls 1421, 1422 as close as possible to the chamber walls 1421, 1422, and extend into the axial hollow space 1240. The solid-state switches 300 are supplied with a direct supply voltage via the axial hollow space 1240.

Further solid-state switches 300, which are connected in series with the first solid-state switch 310 and the second solid-state switch 320, are located in corresponding chambers 1410, 1420. The chambers 1410, 1420 effect a decoupling of the solid-state switches 300 from the potential of the voltage emitted by the coaxial cable 1200 at the output 1230. The chambers 1410, 1420 can be filled with a dielectric or ferromagnetic filling material.

In the HF generator 100 of FIG. 1, the outer conductor 210 of the coaxial cable 200 has sections 211, 212, 213, 214 which are separated from one another by break points 215, 216, 217, 218. In the HF generator 1100 of FIG. 2, the inner conductor 1210 of the coaxial cable 1200 has sections 1211, 1212, 1213 which are separated from one another by break points 1215, 1216, 1217. In a further embodiment of the HF generator, both the inner conductor and the outer conductor of a coaxial cable have sections which are separated from one another by break points.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. An HF generator, comprising:
   first and second solid-state switches, each of the solid-state switches having first and second output connectors; and
   a coaxial cable with first and second conductors, the first conductor successively having a first section and a second section in a longitudinal direction of the coaxial cable, the first and second sections separated from one another by a first break point, the first output connector of the first solid-state switch conductively connected to the second conductor, the second output connector of the first solid-state switch conductively connected to the first section, the first output connector of the second solid-state switch conductively connected to the first section, and the second output connector of the second solid-state switch conductively connected to the second section.

2. The HF generator as claimed in claim 1, wherein the first solid-state switch is arranged in a first chamber bounded by a first chamber wall running in a radial direction of the coaxial cable and a second chamber wall running in the radial direction of the coaxial cable.

3. The HF generator as claimed in claim 2, wherein the second solid-state switch is arranged in a second chamber which is bounded by a third chamber wall running in the radial direction of the coaxial cable and a fourth chamber wall running in the radial direction of the coaxial cable.

4. The HF generator as claimed in claim 3, wherein the second chamber wall and the third chamber wall are designed as one piece.

5. The HF generator as claimed in claim 4, wherein the second chamber is bounded in the radial direction of the coaxial cable by the first conductor and by a sleeve wall.

6. The HF generator as claimed in claim 5, wherein the second chamber is filled with a dielectric or ferromagnetic material.

7. The HF generator as claimed in claim 6, wherein the second solid-state switch has a first supply connector, which is connected to a first supply cable, and a second supply connector, which is connected to a second supply cable, wherein sections of the first supply cable run parallel to the third chamber wall and sections of the second supply cable run parallel to the fourth chamber wall.

8. The HF generator as claimed in claim 7, wherein the first conductor is an outer conductor and the second conductor an inner conductor of the coaxial cable.

9. The HF generator as claimed in claim 8, wherein the solid-state switches are arranged outside the first conductor in the radial direction of the coaxial cable.

10. The HF generator as claimed in claim 7, wherein the first conductor is an inner conductor and the second conductor an outer conductor of the coaxial cable.

11. The HF generator as claimed in claim 10, wherein the solid-state switches are arranged inside the first conductor in the radial direction of the coaxial cable.

12. The HF generator as claimed in claim 7, wherein a third solid-state switch is connected in parallel with the first solid-state switch or with the second solid-state switch.

13. The HF generator as claimed in claim 12, wherein the first conductor has a third section which follows the second section in the longitudinal direction of the coaxial cable and is separated from the second section by a second break point, and further comprising a fourth solid-state switch having a first output connector conductively connected to the second section, and a second output connector conductively connected to the third section.

14. The HF generator as claimed in claim 13, wherein the coaxial cable has a change in dielectric material at the first break point, whereby a wave impedance of the coaxial cable changes at the first break point.

15. The HF generator as claimed in claim 13, wherein the first conductor has a radius that changes at the first break point, whereby a wave impedance of the coaxial cable changes at the first break point.

16. The HF generator as claimed in claim 15, wherein the coaxial cable has a change in dielectric material at the first break point.

17. The HF generator as claimed in claim 16, wherein the change in wave impedance at the first break point corresponds approximately to a load impedance of the second solid-state switch.

18. The HF generator as claimed in claim 17, wherein the change in wave impedance at the first break point is approximately 10 ohms.

* * * * *